United States Patent [19]
Hirsch et al.

[11] Patent Number: 5,572,711
[45] Date of Patent: Nov. 5, 1996

[54] MECHANISM FOR LINKING TOGETHER THE FILES OF EMULATED AND HOST SYSTEM FOR ACCESS BY EMULATED SYSTEM USERS

[75] Inventors: Thomas S. Hirsch, Bedford; Richard S. Bianchi, Billerica, both of Mass.; Ron B. Perry, Wilton, N.H.

[73] Assignee: Bull HN Information Systems Inc., Billerica, Mass.

[21] Appl. No.: 311,646

[22] Filed: Sep. 23, 1994

Related U.S. Application Data

[63] Continuation-in-part of Ser. No. 128,456, Sep. 28, 1993.
[51] Int. Cl.$^6$ ........................................... G06F 3/00
[52] U.S. Cl. ................................................ 395/500
[58] Field of Search ..................... 395/500, 600, 395/650, 700

[56] References Cited

PUBLICATIONS

Notkin et al., "Heterogeneous Computing Environments: Report on the ACM SIGOPS Workshop on Accomodating Heterogeneity", Communications of the ACM, vol. 30, No. 2, pp. 132–140 Feb. 1987.

*Primary Examiner*—Jack B. Harvey
*Assistant Examiner*—Sumati Lefkowitz
*Attorney, Agent, or Firm*—Faith F. Driscoll; John S. Solakian

[57] ABSTRACT

A host data processing system which includes a plurality of input/output devices operates under the control of an enhanced version of the UNIX operating system. The host system includes an emulator which runs as an application process for executing user emulated system (ES) application programs. The emulator includes a number of emulated system executive service components operating in shared memory and an interpreter, an emulator monitor call unit (EMCU) and a number of server facilities operating in the host memory. The ES executive service command handler and file management components are extended to accommodate and to to allow creation and access to linked files within both host and emulated system files. The server facilities include mechanisms for performing trusted user level validation when a command invokes the access of such a linked file and access checking at file access time which ensures security relative to preventing both unauthorized user access and compromises in host file system data by improper use of linked files.

12 Claims, 9 Drawing Sheets

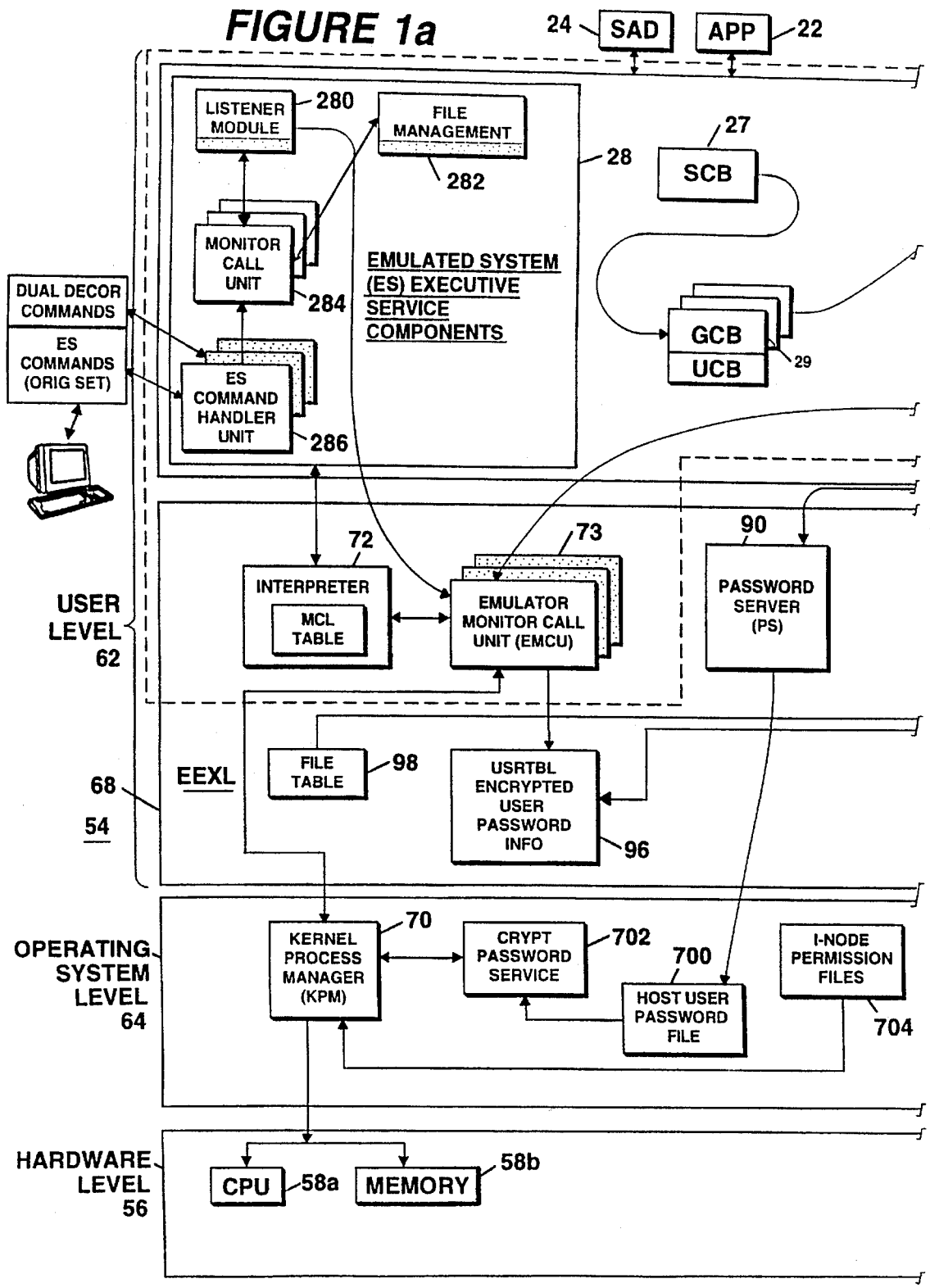

MECHANISM FOR LINKING TOGETHER THE FILES OF EMULATED AND HOST SYSTEM FOR ACCESS BY EMULATED SYSTEM USERS

This is a Continuation-in-Part of copending patent application Ser. No. 08/128,456, filed on Sep. 28, 1993.

RELATED APPLICATION(S)

The patent application of Richard S. Bianchi, Thomas S. Hirsch and Ron B. Perry entitled, "A Dual Decor Capability for a Host System which Runs Emulated Application Programs to Enable Direct Access to Host Facilities for Executing Emulated System Operations," filed on Sep. 23, 1994, bearing serial Ser. No. 08/311,655 which is assigned to the same assignee as this patent application.

The patent application of John L. Curley, Thomas S. Hirsch, James W. Stonier and Kin C. Yu entitled, "A Mechanism for Enabling Emulation System Users to Directly Invoke a Number of Host System Facilities for Executing Host Procedures Interactively or Non-Interactively," filed on Sep. 23, 1994, bearing Ser. No. 08/311,652 which is assigned to the same assignee as this patent application.

The patent application of Thomas S. Hirsch, Richard S. Bianchi, Ron B. Perry and Kenneth S. Buck entitled, "A Mechanism for Viewing the Files of a Host System by an Emulated System," filed on Sep. 23, 1994, bearing Ser. No. 08/311,652 which is assigned to the same assignee as this patent application.

BACKGROUND OF THE INVENTION

1. Field of Use

The present invention relates to the emulation of one computer system by another computer system, and more particularly to software emulation.

2. Prior Art

With the rapid evolution of higher speed computer systems and new microprocessor chip designs, users now have even a greater need to have their application programs written for a specific computer system run on different computer systems. Moreover, it becomes more important than ever to provide this capability without having to convert or port such application programs. Therefore, a number of vendors have developed both hardware and software approaches to achieve this result without having to convert or port such application programs.

One prior art system achieves the above by providing the capability of running a plurality of different operating systems. Each operating system is defined as having an interior decor and are utilized by an apparatus which isolates the operating systems and ensures that only the instructions of the currently active operating system are executed. This system is disclosed in U.S. Pat. No. 4,530,052 to James L. King entitled, "Apparatus and Method for a Data Processing Unit Sharing a Plurality of Operating Systems" which issued on Jul. 16, 1985 and is assigned to the assignee named herein. This system has the limitation of not being able to run more than one operating system at a time.

Another prior art system provides a plurality of central processing units each of which tightly couples together and utilizes a different type of operating system. The central processing units in combination with their operating systems operate in a peer relationship in which all systems have access to all system resources. To ensure the integrity of the most secure of the operating systems (i.e., deemed the proprietary operating system), certain mechanisms are included in the system for enforcing certain restrictions on the other less secure operating system (i.e., deemed the nonproprietary operating systems). These restrictions are that a non-proprietary operating system can only access memory allocated by the proprietary operating system and can use only those channels and input/output instructions specifically assigned by the proprietary operating system. Stated differently, mechanisms are provided to prevent the intentional or unintentional use of resources not assigned to the particular central processing unit and operating system combination.

The above system is disclosed in U.S. Pat. Nos. 5,027,271 and 5,230,065 invented by John L. Curley, et at. entitled, "Apparatus and Method for Alterable Resource Partitioning Enforcement in a Data Processing System Having Central Processing Units using Different Operating Systems" and "Apparatus and Method for a Data Processing System Having a Peer Relationship Among a Plurality of Central Processing Units" which issued on Jun. 25, 1991 and Jul. 20, 1993, respectively, and are assigned to the same assignee as named herein. It will be noted that while this system enables the running of more than one operating system, it requires the use of separate independent central processing units and mechanisms for enforcing the use of only assigned system resources.

When running different operating systems within a system, it becomes desirable to provide a user with the capability of utilizing both systems in an efficient manner. In the prior art system of U.S. Pat. No. 5,230,065, a user is allowed access to both operating systems through a user registration process performed on the proprietary operating system whose results are then transferred to the non-proprietary operating system. When a user has been registered on the proprietary operating system as having access to both systems, the user can issue a special switch command which switches the user's terminal over to the non-proprietary operating system. The switch command allows permanent access (i.e., access until logout from the current session) or temporary access (i.e., access to execute a single command) to the nonproprietary operating system. During this access, the user is able to issue commands while running on the non-proprietary operating system which may for example allow the transfer of data to the other operating system. For a further description of this system and operations, reference may be made to the publication entitled "GCOS6 HVS6 PLUS XC Processor Systems Basics" published by Bull HN Information Systems Inc., dated December, 1991, order number LH39-02.

While the above prior art arrangement allows a user access to both operating systems, such access takes place at the user level while both operating systems maintain their independent mode of operation. It will be noted that this type of access capability can only be invoked at a high level and still requires user interaction with both operating systems as independent entities. Hence, this capability was in effect built on top of both operating systems, relying heavily on a user's ability to issue the proper sequence of commands to both systems for the execution of the appropriate procedures by each operating system. This arrangement is less efficient since it can be very cumbersome and time consuming to use.

Further, the above prior art arrangement does not provide for stringent security enforcement within both operating systems. That is, the proprietary operating system validates security as to unauthorized access for the entire system through the proprietary operating system's log-in mechanism. As to security for preventing compromises in data, the system includes mechanisms which enable the proprietary operating system to enforce resource restrictions on the non-proprietary system. Thus, this type of approach would not be effective in systems such as that of the present invention in the case where the application programs being run on the proprietary operating system are the application programs which are required to be emulated by the host system.

Furthermore, in the type of prior art proprietary operating system contemplated, information disclosing a substantial part of the organization of the operating system and its associated data structures historically have been made accessible to users. Therefore, it is likely that a knowledgeable user could intentionally or unintentionally alter the operating system data structures defining the user's identity and data access rights to gain access to other user system data files. Since this type of activity would go undetected in the prior art system and therefore unpreventable, this would result in significant compromises in system security.

Accordingly, it is a primary object of the present invention to provide access to host file system facilities for more efficient execution of application programs being emulated on a host system.

It is another object of the present invention to provide a method and system which enables application programs referencing linked files while running in an emulation environment on a host system to be efficiently executed in a highly secure manner.

It is still another object of the present invention to provide a method and system for executing application programs running in an emulation environment on a host system which requires no changes to the host system operating system facilities thereby facilitating software enhancement and support.

SUMMARY OF THE INVENTION

The above and other objects of the present invention are achieved in a preferred embodiment of the host data processing system of the present invention which includes a plurality of input/output devices and operates under the control of a non-proprietary operating system. In the preferred embodiment, the operating system is an enhanced version of the UNIX operating system known as the AIX™ operating system developed by IBM Corporation. The host system includes an emulator which runs as an application process for executing user emulated system (ES) application programs which in the preferred embodiment were originally written for use on the DPS6 and DPS6000 family of computers and the GCOS6™ and HVS operating systems developed by Bull HN Information Systems Inc.

The emulator includes a number of emulated system executive service components (e.g., HVS executive service components) operating in ES and host system shared memory environment and an interpreter, an emulator monitor call unit (EMCU) and a number of server facilities operating in the host system memory environment. The ES executive service command handler and file system components are extended and modified to accommodate links created between emulated system and host system files and links created to named pipes for establishing interprocess communications (IPC) between emulated and host systems processes.

The EMCU includes mechanisms for performing an initial level security validation operation which allows subsequent trusted verification of user identity when dual decor commands or functions are invoked. The server facilities include mechanisms for performing a two step security validation process for ensuring security relative to preventing both unauthorized user access and compromises in user data through improper use of dual decor commands or functions. The first step validates security at the user level and the second step validates security at the file level.

More specifically, first, the system validates that the user invoking the operation is in fact a trusted dual decor user. This is carded out by using a unique encrypted description entry of each dual decor user which was previously stored in a user table located in the host memory environment which is inaccessible to ES users. The storing of the entry is done as part of the login procedure in which the ES system, upon verifying that the user is a dual decor user, issues a special monitor call to the EMCU. After validating that the special monitor call came from the proper source, the EMCU verifies that the user is an authorized host system user through the host encrypted password facilities. Once the user identity has been authenticated, the ES system creates the appropriate entry in the user table, which uniquely defines the personality of the user.

In accordance with the present invention, this encrypted description entry has three basic parts or components. These are: the emulated system user id itself which, during the log-in procedure, was established as matching the host user identification; the address of a first emulated system data structure defining the location of the user control block (UCB) and the address of a second emulated system data structure defining the location of the group control block (GCB). The addresses of each set of these data structures are uniquely assigned to a user by the appropriate ES system component during login and only a single copy for any given ES user exists in memory. By maintaining this set of uniquely assigned addresses of these data structures and associating them with the user id, the system of the present invention is now able to determine during the first step of the verification that the user is a trusted dual decor user at the point when a dual decor command or function is invoked by the user.

The user personality is validated by the EMCU confirming that original description or personality of the user has not been changed. That is, the user has not changed the user id so that it no longer is associated with the same set of UCB and GCB originally assigned addresses indicating that the user's personality has been changed.

If the user description is established as being valid, then the required type of server facilities are created or assigned and necessary connections are made between the server facilities and the ES component which initiated the dual decor link operation to the host file system.

If the system determines that the user invoking the dual decor link operation is not a legitimate dual decor user, the system takes no further action (i.e., does not establish the necessary connections) to execute the dual decor link function. Thus, there is no way for the user to have the function executed thus ensuring security. The user is notified of the violation by the particular ES component which initiated the operation.

The second step is performed by the server facilities at the file or directory level at file access time (open) using the built-in file protection mechanisms of the host system to compare the user permissions within the group to which the user belongs against the permissions associated with the data files to be accessed to verify that they are correct. If correct, the requested operation is allowed to proceed. If the user is determined as not having the required level of permission, the server facilities do not perform the requested operation and the user is notified of the access security violation.

In the preferred embodiment, a dynamic server handler (DSH) included as part of the server facilities performs the first step of the security validation operation for essentially all of the different types of dual decor commands and functions. The access check step is performed at a lower level by either a link file or pipe server assigned or created by the DSH unit to perform the particular dual decor operation. Access control checking is done at a lower level where it can be executed by the link file or pipe server designed to handle that operation and for more effective validation of each type of dual decor file access requests (e.g., open, read, write) for the particular type of host file involved. For example, this arrangement ensures security in those situations where it is not possible to determine the type of access being requested by a particular user before an initial phase of the operation is allowed to take place (i.e., pipe mechanisms).

In accordance with the teachings of the present invention, dual decor link commands or functions enabling access to the host file system via links are provided as part of the dual decor facilities. The link (LK) dual decor commands are designated as extensions to existing commands such as by the inclusion of uniquely designed arguments designating host system entities (e.g., host path or procedure names).

The link dual decor commands allow an emulated system user to establish links between files within the emulated system and host system. In the preferred embodiment, a user can create links between host files and emulated system. As indicated above, the files can include standard files and pipes. The pipes are host "named pipes" accessed for establishing interprocess communication between emulated system and host applications for cooperative concurrent processing. In the preferred embodiment, the host files are accessed as emulated system files in binary or text mode.

BRIEF DESCRIPTION OF THE DRAWINGS

FIGS. 1a & 1b are a block diagram of a host system which incorporates the dual decor link command mechanisms of the present invention.

DESCRIPTION OF THE PREFERRED EMBODIMENT

Figure 1B:
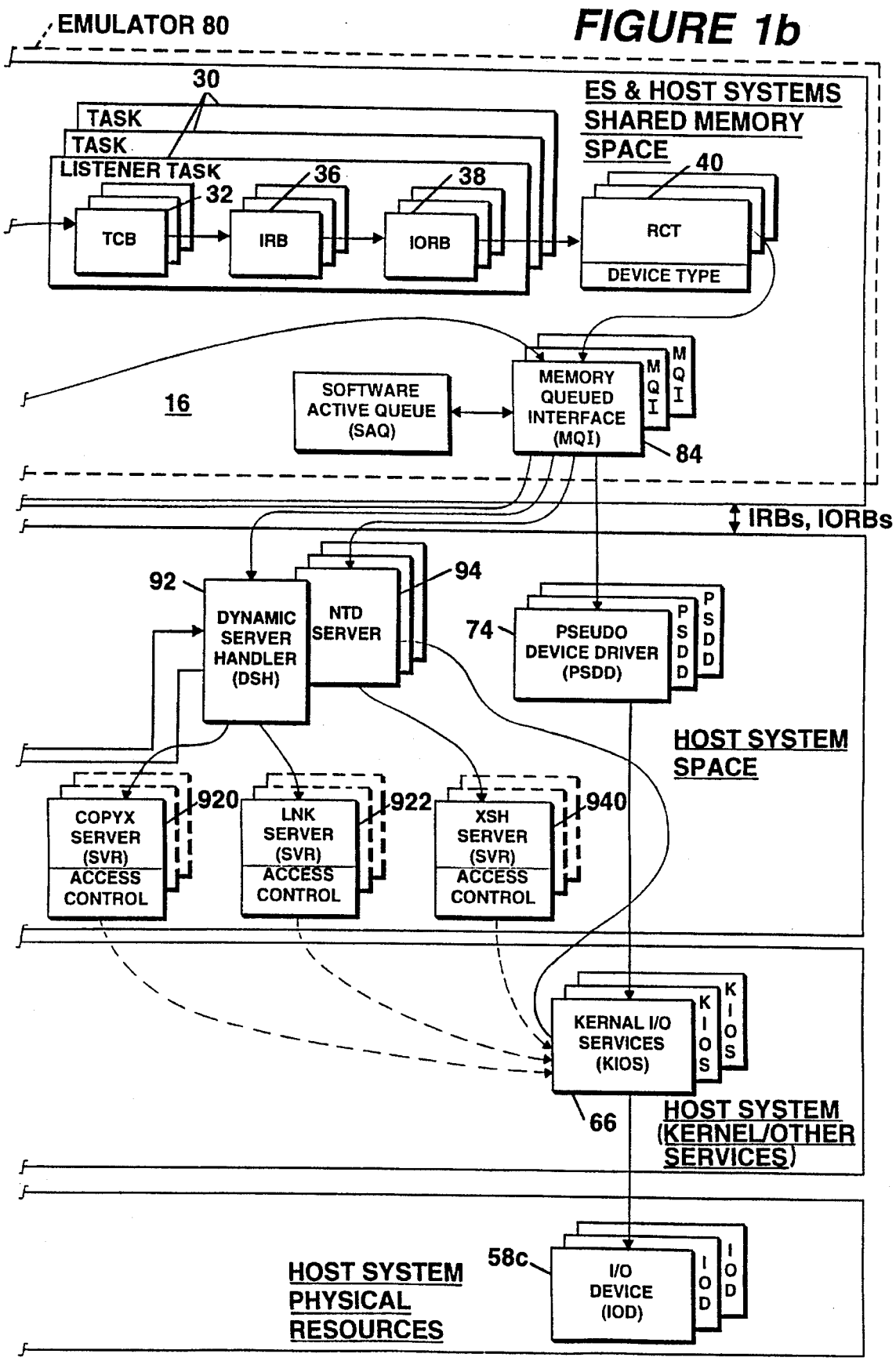

FIGS. 1a & 1b are a block diagram of a host system 54 which incorporates the dual decor components of the present invention. As shown, the system 54 includes a hardware platform 56 which contains the hardware elements such as a central processing unit 58a, a main memory 58b and a number of input/output peripheral/communications devices including a local area network for connecting system 54 to other processing systems via standard communication network facilities.

The central processing unit (CPU) represented by block 58a is a reduced instruction set (RISC) based processing unit which takes the form of the RS6000 microprocessor manufactured by IBM corporation. The hardware platform 56 may also take the form of the DPX/20 system marketed by Bull HN Information Systems Inc.

As seen from FIGS. 1a & 1b, hardware platform including processing unit 58a operates under the control of an enhanced version of the UNIX™ operating system such as the AIX™ operating system. Portions of physical memory represented by MEM block 58b are illustrated in terms of the layered construction. As shown, memory is divided into two basic levels, a user level and a kernel level. The user level is divided into emulated system (ES) and host shared memory space and host or native memory space. The shared memory space contains the ES executive level 16 which includes a plurality of executive program tasks 30 spawned by ES executive services components of block 28 for executing ES application programs 22 and system administrator programs 24.

In the emulated system, each task 30 utilizes a plurality of data control structures, such as a task control block (TCB) structure 32, an indirect request block (IRB) structure 36, an input/output request block (IORB) structure 38 and a resource control table (RCT) structure 40. The task control block (TCB) structure 32 contains information pertaining to the state of execution of the associated task as well as pointers to interrupt save areas for storing hardware parameters related to the task. The indirect request block (IRB) structure 36 contains information defining the operation requested by an associated task and includes pointers identifying the task and its associated task control block (TCB) and a pointer to the associated IORB structure.

The input/output request block (IORB) structure 38 is used as the standard means of requesting a physical I/O service. It contains information such as a logical resource number (LRN) that identifies the I/O device being addressed as well as the location and size of the buffer to be used for the transfer and the specific function (operation) requested. The resource control table (RCT) structure 40 contains information describing the resources, such as its characteristics or information regarding the tasks or requests being executed by a corresponding resource as well as pointers to its associated task control block (TCB) structure.

Additionally, two other structures depicted in FIGS. 1a & 1b utilized by the present invention are a group control block (GCB) structure and a user control block structure of block 29. The GCB structure contains information required to define and control the operations of a specific task group which defines a named set of one or more tasks with a common set of resources within which a user and system function must operate. Each group has a two character name (e.g., $L, $S) by which the group is uniquely known to the system. The GCB structure includes information identifying the lead task whose execution spawns all other tasks required for executing group programs. As indicated, the GCB structure includes a number of user control blocks (UCB), each of which contains information defining the user's personality such as user node identification, user group id within a node, user task id within group, user person id and pointer information to directories to which the user has access.

As shown, the emulated system utilizes a further data structure corresponding to system control block (SCB) structure 27. This data structure is created at system startup and contains information defining system resources and pointers to the different task groups established by the system represented by a corresponding number of group control blocks in the system. For further information regarding such structures and their relationships to each other, reference may be made to U.S. Pat. No. 5,111,384 and the publication entitled "HVS PLUS Systems. Concepts" published by Bull HN Information Systems Inc., Order No. HE03-01.

As indicated in FIGS. 1a & 1b, the shared memory space further includes a memory queued interface (MQI) represented by block 84 which provides a form of interprocess communication mechanism and a software active queue (SAQ) of block 88. SAQ block 88 represents a data structure used to provide the path by which the results of the operations performed by the kernel level components are passed back or returned by the host processes to the requesting emulated system user level tasks 30 being executed. Thus, it can be viewed as functioning as an output stage of MQI 84. This data structure is similar to data structures which are used by the emulated system operating system.

MQI block 84 is a semaphore data structure which takes the form of a single linked list controlled by semaphores through a set of routines which are executed by the various host processes operating within different levels or layers that want to communicate with each other. Its routines are used to manage queues within the pseudo device drivers 74 and the software active queue 88.

Executive Services Components 28

As seen in FIGS. 1a & 1b, the executive services components 28 of executive layer 16 includes a plurality of components or facilities which are equivalent to those facilities normally included in emulated system. The facilities utilized by the present invention include a listener module 280, a file management facility 282, a monitor call unit 284 and a ES command handler unit 286 which are arranged as shown. The listener module 280 is responsible for monitoring the operations of terminals configured for login and for initiating user processes in response to user commands. As indicated in FIGS. 1a & 1b, listener module 280 runs as a task 30 with its own set of unique data structures.

As described herein, the listener module 280 is able to consult a profiles file containing user specific registration information such as user id, login id and password requirements tabulated by the system administrator for all registered users. The listener module 280 checks the user profile when monitoring the privileges and/or restrictions given to each user. The file management facility 282 includes the conventional shared data structure and set of routines normally provided to perform functions that access such data structure to control the synchronization of concurrent processes or tasks in addition to performing various system services or functions. That is, the facility responds to system service monitor calls identifying the types of services requested (e.g. creating or deleting files, reading or writing records or blocks in files) which result in the specified system services being executed by the emulated system on behalf of executing user application programs.

File Management Data Structures

The ES file management component 282 utilizes a number of data structures in conjunction with carrying out file system services as described in greater detail herein. Information about a ES disk device including the device name as well as the name of the logical volume currently mounted on that device is maintained in a volume descriptor block (VDB) structure. A chain of VDB's is provided off of the SCB. The emulated system file system provides a directory tree structure within each mounted disk volume. For each file, index and directory being accessed, information is maintained in memory in a file descriptor block (FDB) structure. FDB's are organized and chained in memory in a tree structure which emanates from VDB's similar to how it is organized on the disk. FDB's contain the name of the file, links to the superior and inferior directory FDB levels as well as a link to the next FDB on the same directory level. FDB's contain logical information such as record size, key locations and sizes which allow for logical record level I/O services.

In addition, an FDB describes where (at what physical sectors) the data of the file is located and also contains information necessary to request I/O services from the appropriate device driver in the system being emulated. An FDB is created in memory as a result of a user application monitor call which reserves the file for processing and it is deleted when the application removes the file.

Also, the ES file management component 282 creates a file control block (FCB) data structure which contains information relating to a specific use of the file such as a current record pointer (e.g., one instance of opening the file). The FCB structure is found by locating a logical file table (LFT) linked to the group control block (GCB) structure. The LFT is simply an array of pointers to FCBs. The logical file number (LFN) is assigned when the file is reserved and serves as an index into the array.

For non-disk devices such as tapes, primers and terminals, a device descriptor block (DDB) structure is maintained. A DDB contains the name of the device as well as logical information such as record size. For tapes, a DDB contains the name of the volume currently mounted on the device and the name of the file currently being accessed. A DDB also contains the physical information necessary to request I/O services from the appropriate emulated system device driver. A chain of DDBs is provided off of the SCB and this chain as other chains are created during system configuration (startup).

The monitor call unit 284 receives monitor calls from the interpreter component 72 which are in turn to be executed interpretively using the ES executive service components of block 28. The command handler unit 286 contains the routines that respond to user commands entered via a terminal or program. In response to such commands, the unit 286 routines invoke the appropriate processes for executing such commands. As discussed herein in greater detail, each of these components have been augmented or extended to incorporate different dual decor aspects or features according to the teachings of the present invention.

Emulator Level Layer 68

As indicated in FIGS. 1a & 1b, the next layer within the user level is the emulator executive level 68. This level includes certain components present in the emulated system which have been transformed into new mechanisms which appear to the remaining unchanged components to operate as the original unchanged components of the emulated system. At the same time, these new mechanisms appear to the components of the kernel level 64 as native components with which the host system is accustomed to operate. As shown, the components include the interpreter 72, an emulator monitor call unit (EMCU) 73, a plurality of servers 90, through 940, and a plurality of pseudo device drivers (PSDD) 74 arranged as shown.

Additionally, level 68 includes a data structure in the form of user table 96 which contains entries which uniquely define the personalities of the different dual decor users. This table is maintained to be able to determine that a given user has successfully gone through the login procedure. In accordance with the present invention, each such encrypted user description entry has three basic parts or components. These are: the emulated system user id itself which during the log-in procedure was previously established as matching the host user identification; the address of a first emulated system data structure defining the location of the user control block (UCB) and the address of a second emulated system data structure defining the location of the user group control block (GCB). The Appendix shows the format of these entries in greater detail.

The interpreter 72 successively fetches the instructions of an emulated system application program, categorizes each instruction and executes it interpretively through sequences of RISC instructions which allows CPU 58a, MEM 58b and other elements of host system 54 to emulate the operations of corresponding elements of the emulated system. The interpreter 72 includes a monitor call (MCL) table containing information for each possible monitor call which it utilizes to determine whether to trap or send an ES monitor call to the ES executive services components 28 for execution of the instruction or to make an emulator call to EMCU 73 for execution of the instruction through the services of an appropriate C language routine (server). The EMCU 73 is responsible for acquiring from the host system 54, the necessary memory and other resources, for initializing the emulated system data structures and invoking interpreter 72 and the various server processes. Both the interpreter 72 and EMCU 73 run as host processes but not as root.

As viewed by the host system, the ES service components 28 and tasks 30 being executed on behalf of the application programs, the interpreter 72 and EMCU 73 are executed in the system 54 of FIGS. 1a & 1b as a single process 80 wherein such process corresponds to one or more user processes as defined by the conventions of the host operating system being run on host system 54. Thus, it is possible to have multiple instances of the emulated system concurrently emulated on host system 54.

The password server 90, the dynamic server handler (DSH) 92 and the network terminal driver (NTD) server 94 are created by EMCU 73 during initialization. Each of the servers 90, 92 and 94 communicate with emulated system processes through MQI 84 as indicated. The lower level group of servers 920, 922 and 940 are dynamically created by their respective higher level servers 92 and 94 for carrying dual decor operations according to the present invention. All of the servers operate as root and therefore have super user privileges with access to any file within the host system 54. The NTD server 94 is designed to contain the functionality required to handle different types of terminals such as the network terminal driver described in U.S. Pat. No. 4,951,245 which issued on Aug. 21, 1990.

As described in detail herein, both the servers 92 and 94 include mechanisms specifically designed for validating security at the user level in conjunction with the execution of dual decor commands and functions. As shown in FIGS. 1a & 1b, the lower level group of servers 920, 922 and 940, each include access control mechanisms used to validate security at the file level. In the case of server 940, host access control mechanisms are used.

As indicated in FIGS. 1a & 1b, the EMCU 73, dynamic server handler 92 and NTD server 94, each have access to a data structure in the form of a user table (USRTBL) 96 which has been located in host space so as to be inaccessible to ES user application programs. As described herein in greater detail, the table 96 contains encrypted user descriptor information which is used for validating a user's identity according to the teachings of the present invention. The encryption ensures security in the event of a memory dump.

Also, the emulator level includes a file table structure 98 which is used for storing information pertaining to linked host system files being processed by the server facilities for which links to emulated system files were created as the result of having invoked dual decor link commands. Such information provides an appropriate reference information for processing successive reads or writes to and from a given host file as described herein.

As indicated in FIGS. 1a & 1b, the emulator executive level 68 further includes a plurality of pseudo devices drivers (PSDD) 74 for each input/output device or type of input/output device which is required to be emulated by host system 54. For example, the pseudo device drivers 74 will include PSDDs for terminals, disk drivers, tape drivers, displays and for certain communication devices.

For a more detailed discussion of other aspects of the SAQ 88, MQI block 84, PSDD 74 and other emulator components, reference may be made to the related patent application.

Operating System/Kernel Level

The operating system/kernel level 64 includes the standard mechanisms and components normally included within the host operating system. As shown, level 64 includes a kernel process manager component 70, a host user password file 700, a host crypt password service facility 702, Inode permission files storage 704 and a number of host kernel I/O services (KIOS) processes 66 for each pseudo device driver (PSDD) 74 which is to be emulated by the host system and for each of the servers 920 through 940 assigned to execute dual decor commands and functions. Since the components of the kernel level 64 are well known, they are only briefly described herein. The host user password file 700 is used for storing information identifying registered host users. This file is updated and maintained by the host operating system kernel process manager 70. A part of the information stored in the password file 700 is the user encrypted password generated using the one way crypt password service facility 702 invoked by the kernel process manager 70.

Additionally, in the preferred embodiment of host system 54, level 64 is assumed to contain the standard utility programs, shell, editors, compilers, etc. and libraries (e.g., I/O libraries, open, close) which are accessed in the host user mode. For further information regarding the use of such arrangements, reference may be made to publications of the IBM Corporation describing the AIX operating system.

Host System File System

The host file system consists of a sequence of homogeneous logical blocks, each containing a convenient multiple of 512 bytes. In the host file system, the internal representation of a file is given by an Inode which is the contraction of the term index mode. The mode contains a description of the disk layout of the file data and other information such as the file owner, access permissions and file times. Every file has one Inode, but the Inode may have several names or links, all of which map into the Inode. The kernel maintains a file table and a user file descriptor table. The file table is a global kernel structure and contains information for tracking where a user's next read or write starts and the access rights allowed to the opening process. The user file descriptor table is allocated per process and contains information identifying all open files for a process. When a process opens or creates a file, the kernel allocates an entry from each table corresponding to the file's Inode. The entries in the user file descriptor table, file table and Inode table maintain the state of the file and user's access to the file.

The Inode permission files storage contains entries listing the attributes and disk addresses of each file in the system. Each Inode entry contains information about the type, size, times, ownership and disk blocks in each Inode. The directory structure in the host system uses entries, each of which contains just a file name and its Inode number. The attributes of an entry include references to access control lists (ACLs) defining the file's base and any extended permissions. The base permissions correspond to the traditional file access modes (i.e., read, write and execute/search) assigned to a file owner, file group and other users. The extended permissions designate how the base permissions have been modified in terms of permitting, denying or specifying access modes for specific individuals, groups, or user and group combinations designated by user and group ids. For the purpose of the present invention, this arrangement can be considered conventional in design. For further information regarding the use of such arrangements, reference may be made to publications of the IBM Corporation.

DESCRIPTION OF OPERATION

Figure 2A:
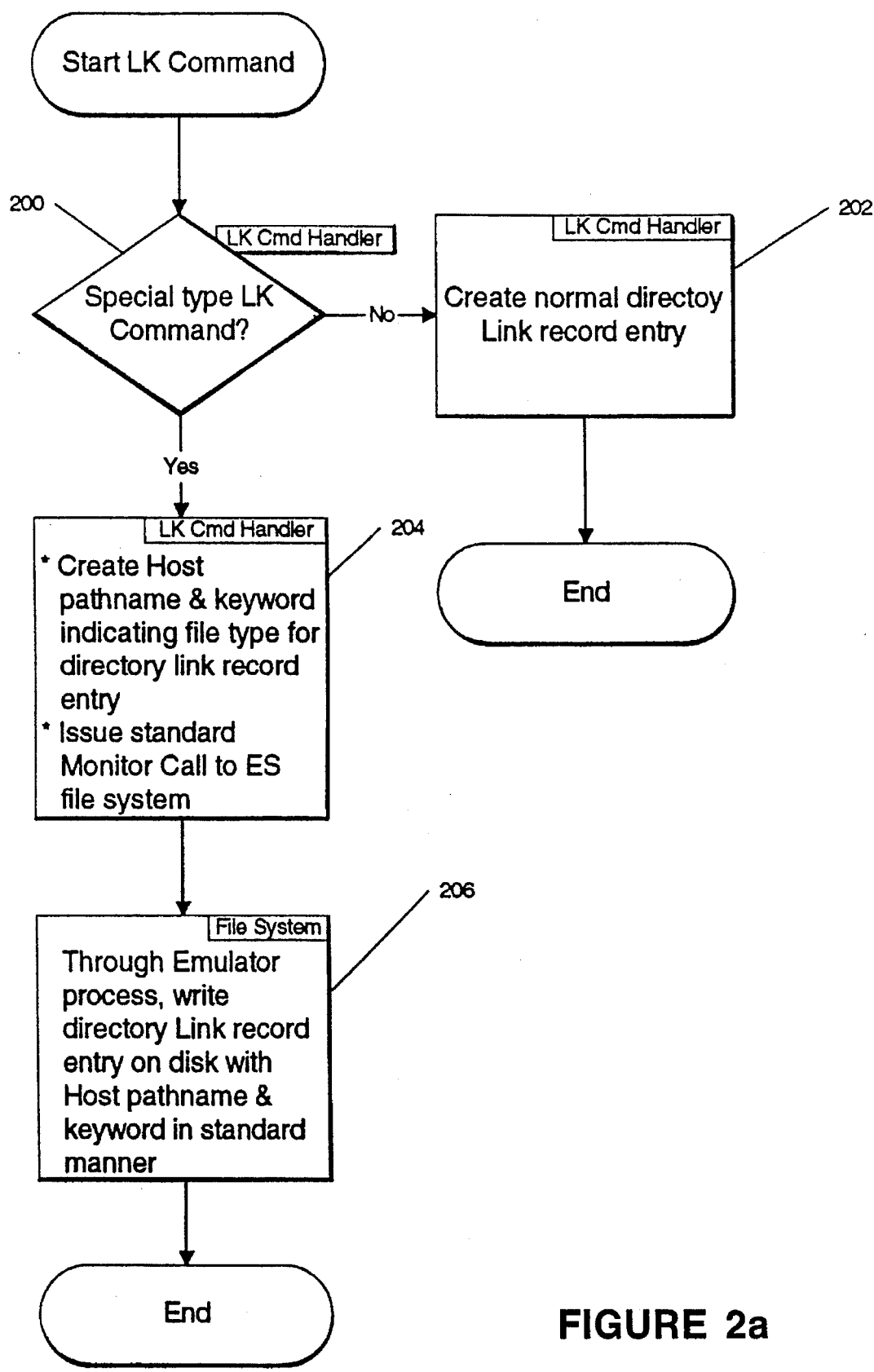
FIGS. 2a through 2f are flow diagrams used to explain the operation of the present invention.
Figures 1, 2B:
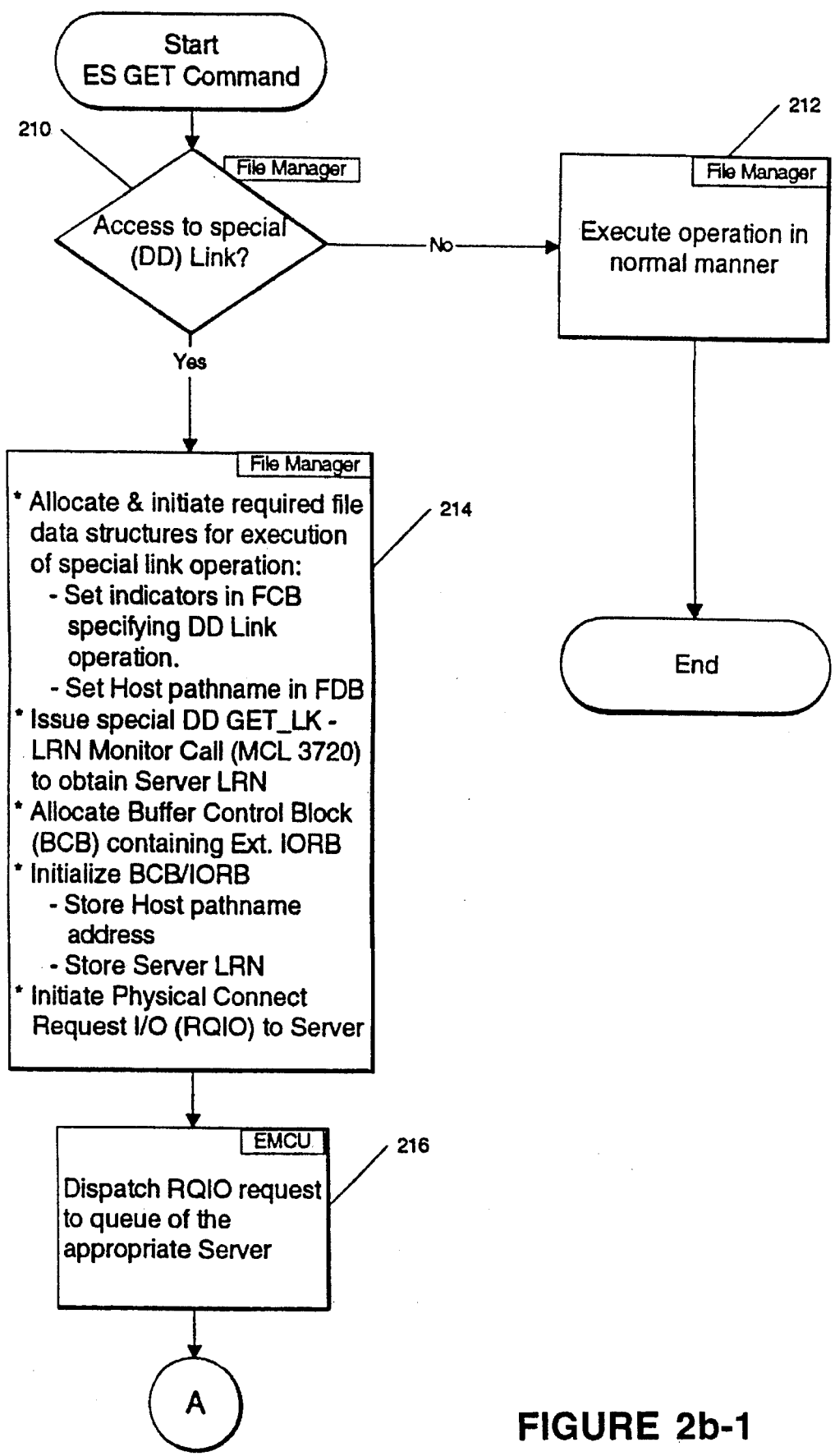
Figures 2, 2B:
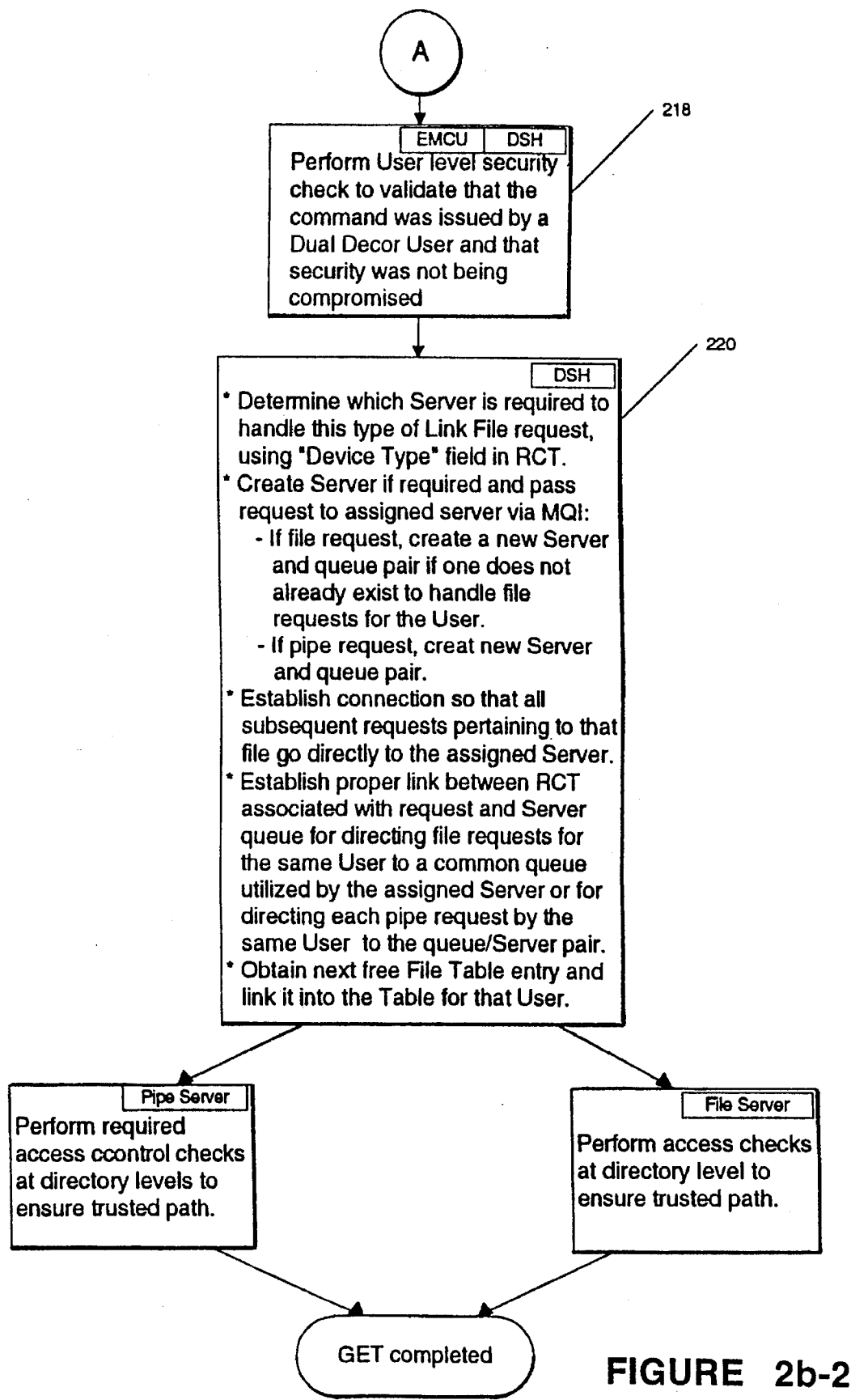

With reference to FIG. 2, the dual decor link command mechanism incorporated into system 54 according to the teachings of the present invention will now be described. As diagrammatically illustrated in FIGS. 1a & 1b, dual decor commands encompass new commands and extensions to existing emulated system commands. The dual decor link (LNK) file commands can be viewed as extensions to existing commands.

The format of the LNK command is:

LK GCOSNAME "X:xpath" [-BINARY|-TEXT][-FILE|-PIPE].

The term "LK" specifies the link command code which is followed by a series of arguments. The arguments are used to define a subset of the large number of emulated system file types. The arguments essentially indicate what the host file type as viewed by the emulator system. The argument GCOSNAME specifies the emulated system name of the link.

The arguments -BINARY|-BIN|-B|-TEXT|-TXT|-T specify whether the pipe or link being created is a binary pipe or link or a text pipe or link. The xpath argument is a host pathname for the link. The pathname is case sensitive. It must be enclosed in quotes to protect lower case characters and start with the prefix x: or X:. When the pathname does not start with the prefix x: or X:, it is assumed to be an emulated system file. If the LNK command specifies linking to a file that does not exist, the file will be created if security access permissions are satisfied. The -FILE argument is used to create a link to a file and not used with -PIPE. The -PIPE argument is used to create a named pipe and is not used with -FILE. The LK command has the following defaults:

| Argument | Default |
|---|---|
| LK . . . | binary file |
| LK . . . -FILE | text file |
| LK . . . -PIPE | text pipe. |

It will be assumed by way of example that a user registered as a dual decor user has successfully completed the login procedure. Since login has been successfully completed, the appropriate encrypted entry defining the user's personality will have been stored in user table 96 and, hence, is available for use during execution of file operations accessing links created between host and emulated system files as described herein.

The user entered LK command invokes a command processor (not shown) included within block 28. The command processor is a system software component that reads each command line entered by a user through a terminal or from a command file and then passes it to the appropriate command handler within block 28 for execution. Since the LK command is an extension to an existing command, the LK command handler has been modified and receives the command line arguments from the command processor via a pointer.

The LK command handler retrieves the arguments and parses them verifying that the arguments, such as pathname and file types are valid and supported file types. Any errors in pathname or file type are reported and processing of the LK command is terminated.

As indicated in FIG. 2, the LK command handler, during its examination of the arguments, determines if the command is a dual decor link command which specifies the creation of a link to a host file or pipe (block 200). If it is not a dual decor link command, then the operation proceeds in a normal manner resulting in the creation of an emulated system directory link entry which is then written to the file system (block 202). If it is a dual decor link command as designated by the "X:", then the LK command handler creates the host file system pathname and a keyword designating the file type. The file type keyword is derived from the text, binary file and pipe arguments which provide a certain level of information about the characteristics of the particular host file for which the link is being created. That is, there are four possible file types which correspond to the four combinations: binary file, binary pipe, text file and text pipe. The four combinations are compressed into one key word value.

Next, the LK command handler issues a standard file system monitor call which is passed by monitor call unit 284 to file management component 282. As indicated in FIG. 2, the file system component 282 issues a request I/O (RQIO) for writing the appropriate directory link file entry on the emulated system disk like any other link entry. The request is handled like any other I/O request made by an emulated system user. Briefly, the request is passed through MQI 84 to the appropriate pseudo device driver which initiates the write to the disk I/O device via kernel I/O services block 66.

As seen from FIG. 2a, this completes the execution of the LK dual decor command. Nothing further is done regarding the created link until a user reserves the emulated system file associated with the earlier link prior to opening it by issuing a get file command or system monitor call. Such calls are used to control file concurrency.

The GET file command as in the emulated system results in a system call being issued by monitor call unit 284 to the file management component 282. As seen in FIG. 2b, the file management component 282 during its processing of the call arguments determines if the link name contains an "X:" indicating access to host link files and is to be treated in a special fashion. If it does, then as part of resolving the link name, it stores the name away in an appropriate structure so that it can reference it later. Since information about the type file is already available, no file system calls are issued. Component 282 uses the keyword identifying the file as either text or binary or either pipe or file to set up internal indicators in a predetermined manner for designating the characteristics of the type of file to be processed (block 210). If the file management component 210 does not contain an "X:", it executes the operation in the normal manner (block 212).

As indicated in FIG. 2b, the file management component 282 next allocates and initializes the FCB and FDB file control block (FCB) and file descriptor block (FDB) structures as required to execute the link operation. More specifically, indicators are set within the FCB to designate that this is not a normal link unit specifying host access requiting dual decor functionability. The FDB is set up to identify the emulated file system/host file system pathname.

Also, a buffer control block (BCB) structure is allocated and is used for setting up the Request I/O (IORB) structure which will be used for every operation on the file. The BCB structure is accessed by an address pointer contained in the FCB structure.

The IORB structure is extended to store certain types of information required for processing the dual decor link operation. This includes an address to the file table, pointers to the current files, write seek value fields for enabling the emulated system to update the necessary file system data structures and the FCB address for the file as a convenient reference pointer. Another field corresponding to a link pipe |link file| CPX field is used on IORB CONNECTS and enables DSH server 92 to determine the type of CONNECT. Other fields such as FS failure and I/O failure are used to pass back different error code information. Also, the IORB includes fields for referencing the BCB. The IORB structure is described in greater detail in the Appendix.

As described herein, the file system 282 uses the IORB structure in a bidirectional fashion. It initializes it and sends it down to the server in the case of all requests. For the most part, the contents of the basic IORB fields are reset for each request by the server except for the contents of several fields such as the pathname field, a range of pathname field defining the number of bytes in the pathname, and other information which are passed across in a special manner only for the first request. Since the same IORB is used in subsequent requests, some of the fields are used by the server as working storage.

As indicated in FIG. 2b, the file management component 282 initializes the BCB/IORB structure to store the pathname address and the server LRN value (block 214). Next, the file management component 282 obtains the LRN of the DSH92 server and then initiates a request I/O (RQIO) emulated system monitor call specifying a physical connect operation.

The request is received by the EMCU 73 together with the IRB containing the LRN value of DSH92 and other information for processing the request. EMCU 73 receives all such requests and has the responsibility of determining which server is to receive each request. It will be noted that in the case of linked file request, there will be a different LRN value for each file opened by the same user and that only one server will be created or assigned to process all requests for a given user. In the case of linked pipe requests, a different server will be created or assigned to process each such request. Each server has its own queue on which requests are placed.

Therefore, EMCU 73 includes a dispatching mechanism for determining which servers/queues are to receive the linked file and linked pipe requests using only the LRN values contained in the associated IRBs. The dispatching mechanism utilizes the RCTs, each containing a number of type fields and associated with the files and are in mm linked to the server queues. The EMCU dispatching mechanism references the RCT for the particular file designated by the LRN value and obtains a pointer from the user table 96 which identifies the server queue and places the request on the queue. When a new server is created, a server request queue will also be created and linked off the user table entry for that server.

In the case of the RQIO to DSH92, EMCU 73 places the request on the MQI queue for the DSH server 92. When no server has been created or assigned to process this user's request, the RCT entry corresponding to the LRN is set to a value (i.e., ZERO) to indicate this fact (block 216).

As indicated in FIG. 2, DSH server 92 performs a user security level check to validate that the command specifying access to the dual decor (special) link was issued by a dual decor user and that security is not being compromised (block 218). This is done by obtaining the encrypted user id and UCB and GCB address information from user table 94 and comparing against the current user id and UCB and GCB address information after encrypting it. Assuming that the current user personality is the same validating the user as a "trusted user", DSH92 next determines which server is required to handle this type of request. DSH92 makes this determination by obtaining the RCT entry using the LRN value contained in the IORB and examining the "device type field." If the "device type field" indicates that a server does not exist for this type of request, then DSH92 creates a server and passes the request to the assigned server via MQI. That is, DSH92 issues fork and exec system calls to the kernel manager 70 which spawns a new host process running LK file or LK pipe server code as root. DSH92 then enqueues the IORB onto the server's MQI queue (block 220). If the request is a LK file request, DSH92 creates a new server and queue pair if one does not already exist to handle the file requests for that user. If the request is a LK pipe request, DSH92 creates a new server and queue pair for each such request. That is, each time DSH92 creates a new server, it also creates a request queue within file table 96 and links it off the user table entry for that server.

Next, DSH92 establishes the connection between the file management component 282 and the assigned server so that all subsequent requests pertaining to that file go directly to the assigned server. That is, DSH92 establishes the proper link between the RCT associated with the request and the server queue for directing file requests made by a given user to the single common queue utilized by the assigned server and for directing each pipe request made by a given user to the queue of a different server. This is done by linking the server off of the RCT from the LRN. Next, the next free queue entry is obtained from the file table 96 and linked into the user table entry for that user as described above (block 220).

As indicated in FIG. 2b, either the pipe server or file server performs the required access control checks to determine that the user has the required permissions for maintaining security (blocks 222 and 224). Since the command is a get command, it is not known at this point exactly what type of operation the user intends to perform on the reserved file. Therefore, the access control check is performed at the directory level. If the user has access to the file being reserved and is able to open the file, then the server will deem that the user has the required access permission. Hence, no violation will be reported and the execution of the get command deemed completed.

Figure 2C:
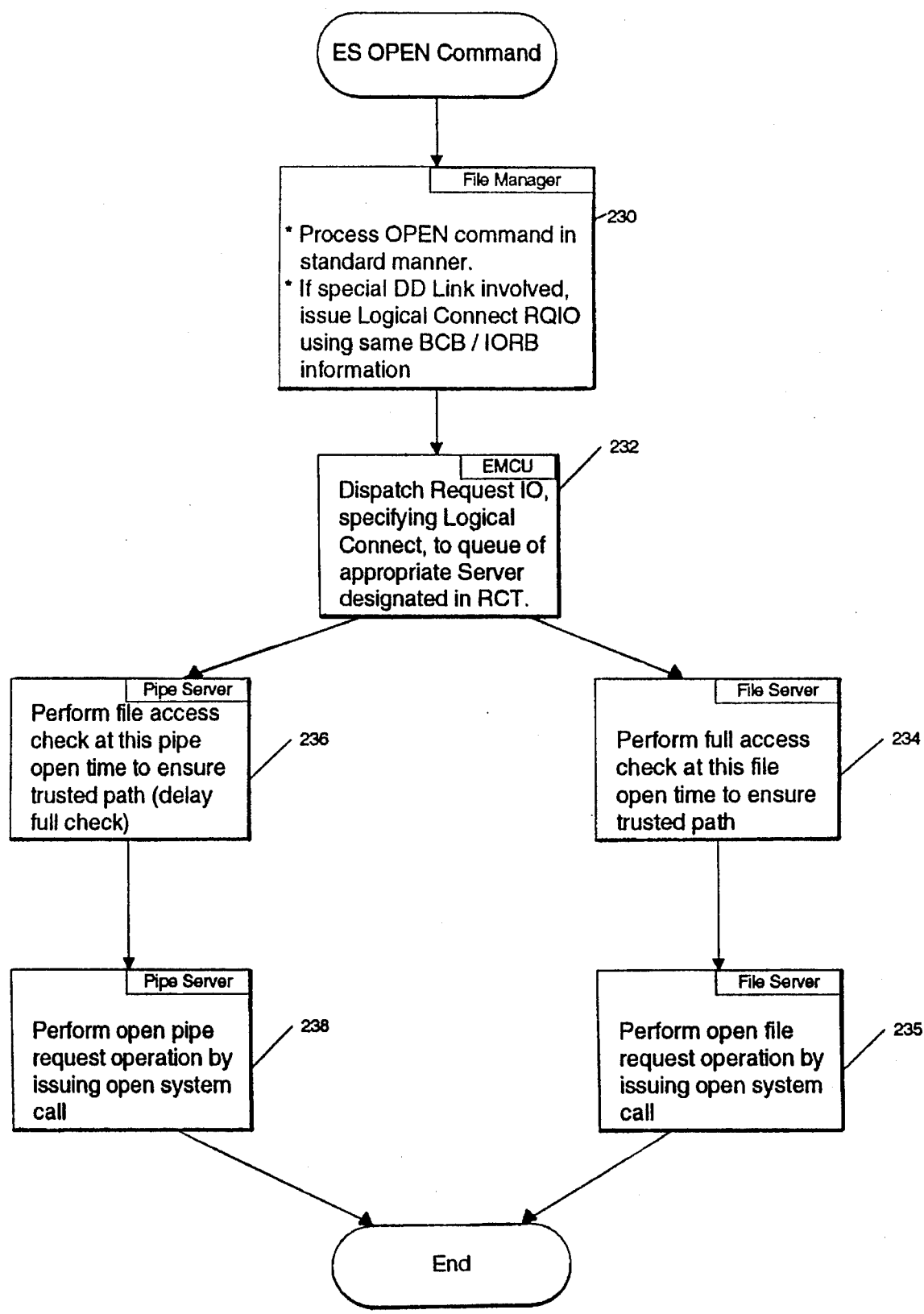

Normally, the user next issues an open command after the get command. Referring to FIG. 2c, it is seen that the file management component 282 executes its normal sequence of operations until it reaches a point where it determines that a special dual decor link file is involved. It then issues a Request I/O (IORB) for performing a logical CONNECT using the same IORB that was provided for the reserve file operation. Hence, the IORB is issued to the same server LRN that was given the last RQIO (block 230).

As indicated, EMCU 73 receives the request and dispatches the IORB to the queue of the appropriate server designated in the RCT for that particular file. EMCU 73 references the RCT, gets the user table address and puts the request on the appropriate queue (block 232). If the request is a LK file request, the file server performs a full access check at this time at which the file is being opened (block 234). Assuming that the user has the required permissions, the file server issues an open system call to kernel manager 70 which results in the opening of the host file (block 235).

If the request is a LK pipe request, the pipe server defers the complete access check (block 236). The pipe server then performs the open request by issuing an open system call to the kernel manager 70 which results in the opening of the host pipe (block 238).

Figure 2D:
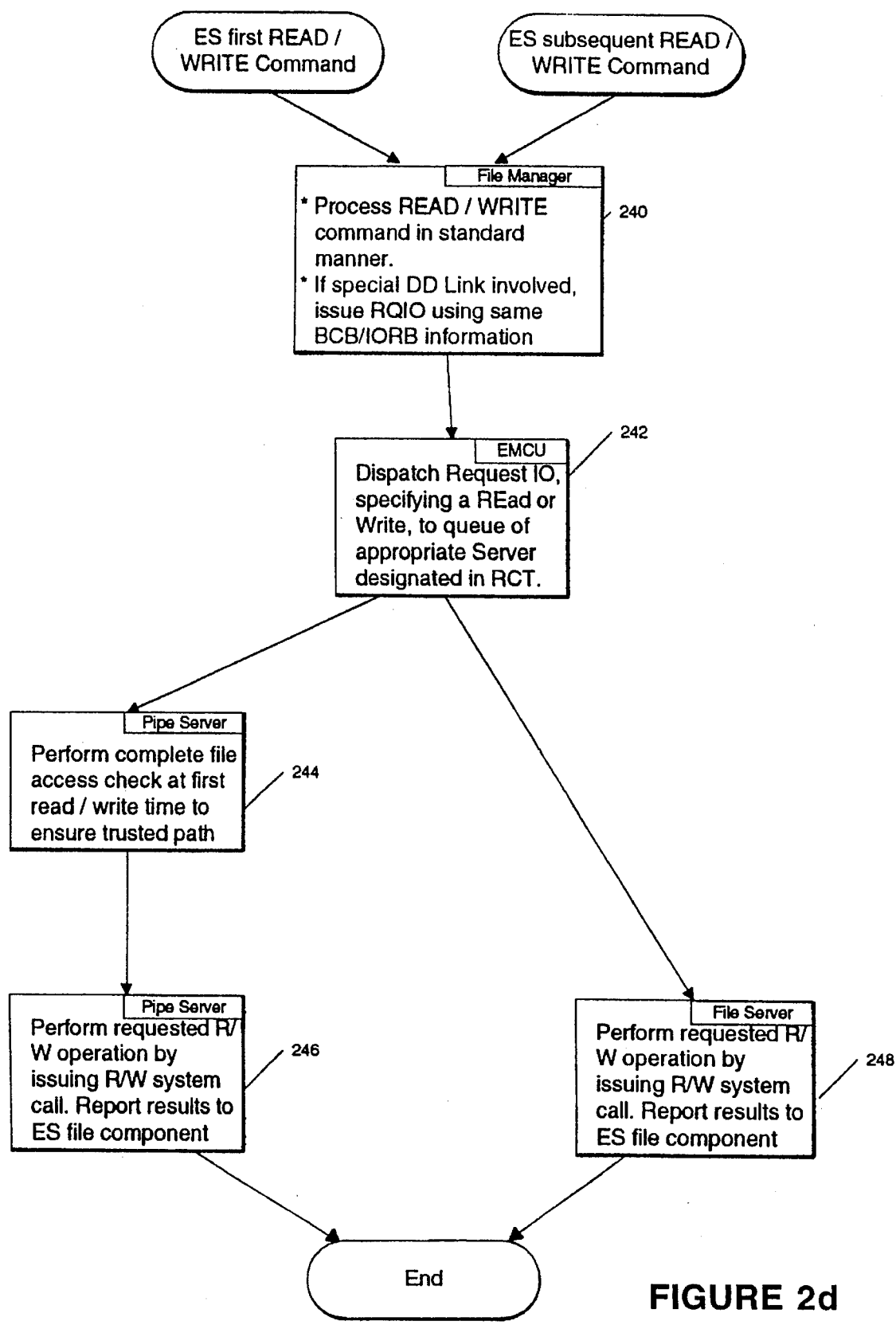

The open command is then followed by a first read or write command and then further read or write commands as indicated in FIG. 2d. These commands are processed in the same manner as the open command. That is, the operations of the blocks 240 and 242 are the same as those of blocks 230 and 232, respectively, except for the type of IORB (Logical CONNECT vs. read/write).

If the request is a LK file request, the file server performs no further access control checks, since it established proper access previously. Next, the file server issues a read/write system call to kernel manager 70 for performing the requested operations on the specified host file.

If the request is a LK pipe request, the pipe server at the time of the first read or write is able to perform a complete access control check to determine that the request specifying the dual decor link pipe operation was invoked by a trusted user having the required permissions. Assuming that is the case, then the pipe server issues a read/write system call to kernel manager 70 for performing the requested operation (block 246).

Figure 2E:
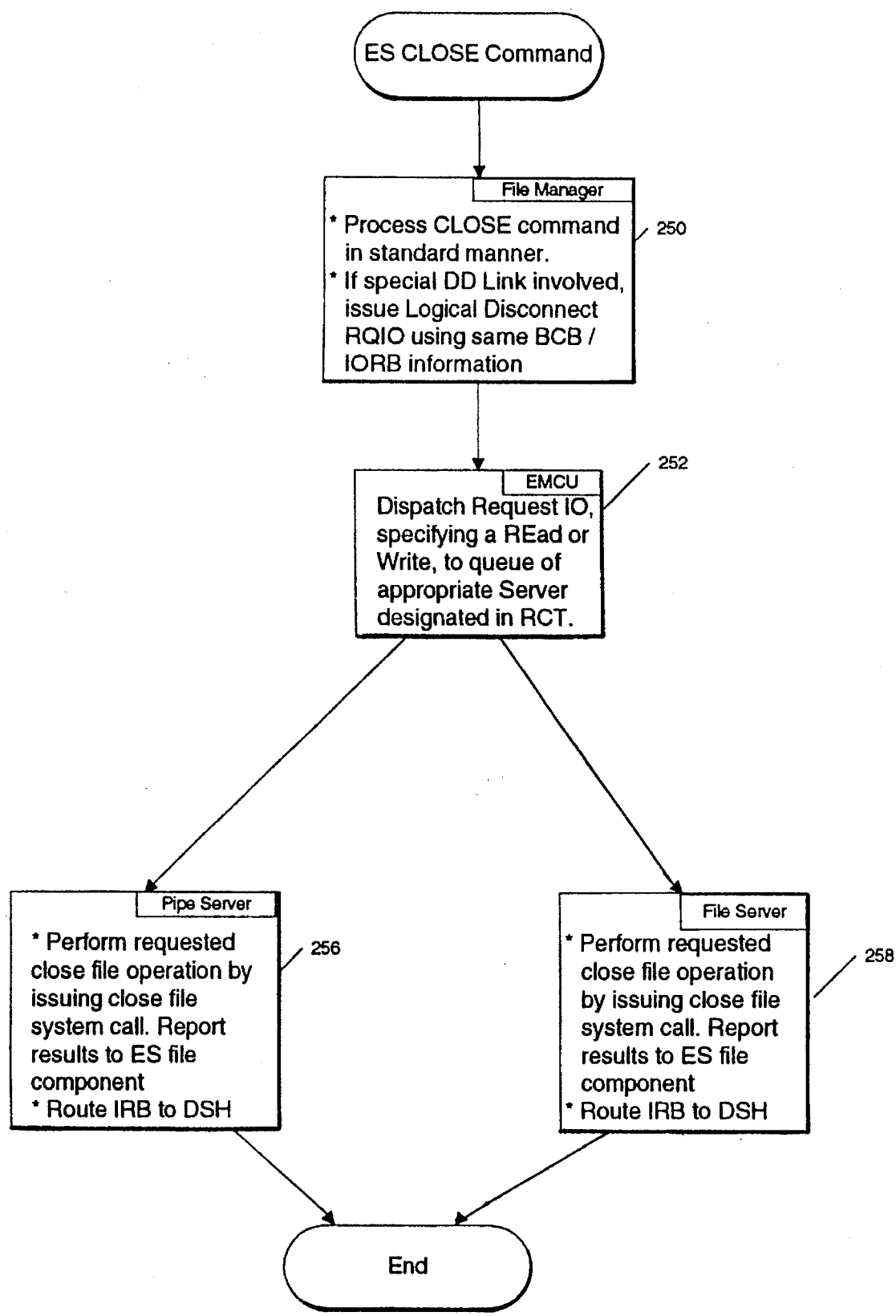

As indicated in FIG. 2d, the pipe and file servers both execute subsequent read/write commands without further access control checks. The servers process commands in the same manner until a host close command is issued. As indicated in FIG. 2e, this command is also processed in the same manner as the open and read/write commands. The only different is that the pipe and file servers each perform the requested operation by issuing a close system call to kernel manager 70 (blocks 256 and 258). This results in the closing of the file or pipe by the host file system. Also, at that time, the server routes the IRB to DSH92 and frees up the File table entry. When DSH92 determines that all files/pipes associated with a server have been closed, then it kills the server and marks the RCT as available.

Figure 2F:
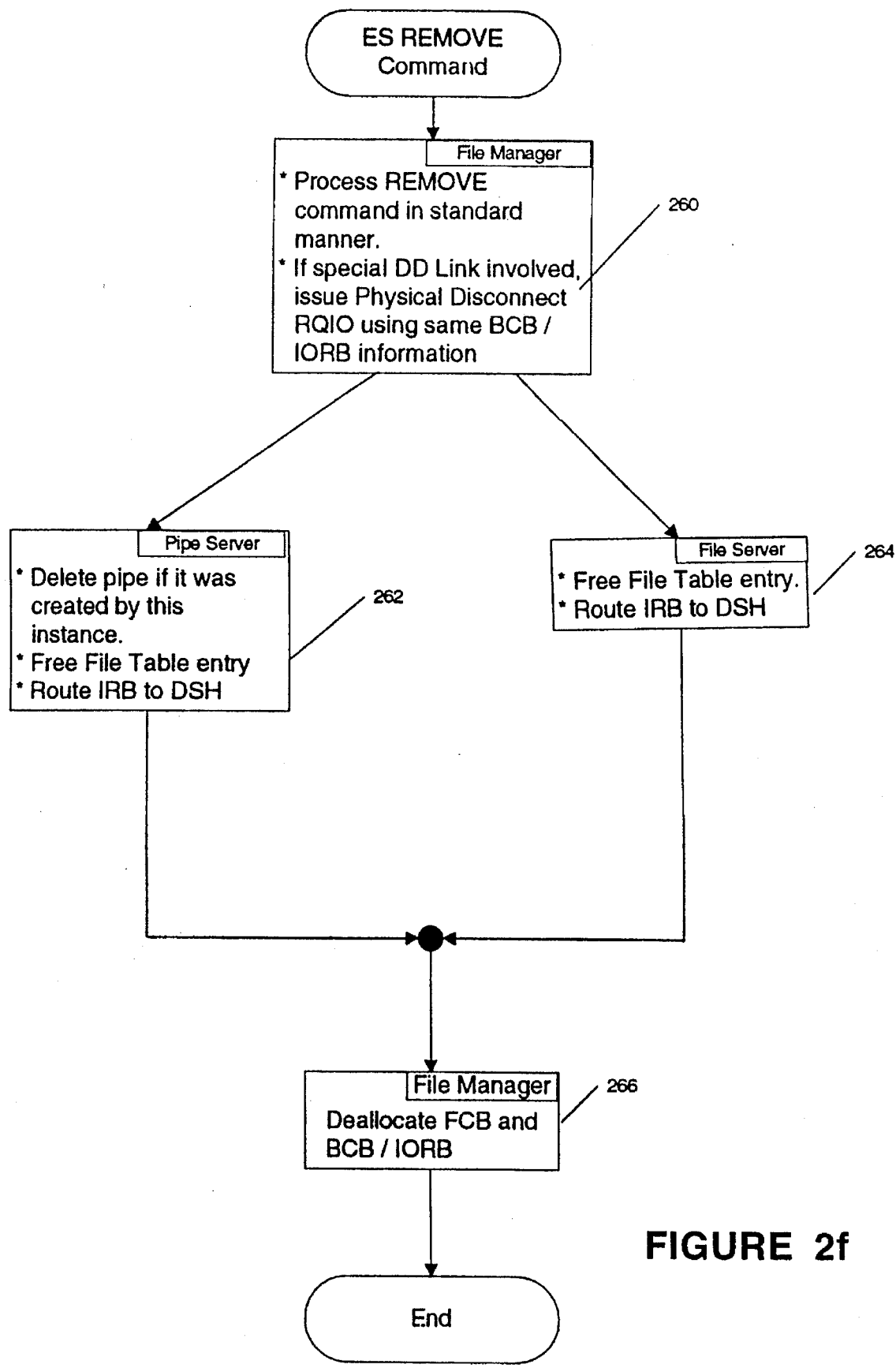

The last emulated system command issued is a remove command. As indicated in FIG. 2f, the remove command causes the file manager component 282 to again process the command in a normal manner. Upon determining that a special dual decor link is involved, component 282 operates to remove the appropriate data structures.

From the above, it is seen how the dual decor link file/pipe mechanisms of the present invention are integrated within a host system to allow trusted users to access host files and pipes.

APPENDICES

These Appendices include source listings which are subject to copyright protection. The copyright owner, Bull HN Information Systems Inc., has no objection to the facsimile reproduction by any one of the patent disclosure, as it appears in the Patent and Trademark Office patent files or records, but otherwise reserves all copyright rights in such listings whatsoever.

| | |
|---|---|
| APPENDIX A — Dual Decor Components | Pages A-1–A-48 |
| APPENDIX B — LN Command Examples | Pages B-1–B-5 |

It will be apparent to those skilled in the art that many changes may be made to the preferred embodiment of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A host system having a memory organized into shared and host memory areas and a hardware platform including a plurality of input/output devices operatively connected for executing host system instructions and for emulating the execution of emulated system instructions by an emulator running as an application process on said host system, said plurality of input/output devices including input/output devices for storing files contained within emulation system and host file systems, said emulator including a number of emulated system executive service components operating in said shared memory area comprising a command handler unit and file management component operatively coupled to said command handler unit for managing files of said emulated system file system and an interpreter, an emulator monitor call unit (EMCU) and server facilities operating in said host memory area, said host system further including operating system facilities for providing a number of services for host programs, said operating system facilities being coupled to said plurality of input/output devices and to said EMCU, said host system further including a link file facility for linking together files of said emulated file system and said host file systems, said link file facility comprising:

link file command handler means included within said command handler unit, said command handler means responsive to each link (LK) command specifying creating a link to a host file generating a standard file monitor call to said file management component accompanied by information coded in a predetermined manner for specifying characteristics of a host file for which said link is being created for writing as a directory link entry in a file of said emulated file system;

link file means included in said file management component in response to each standard file monitor call from said link file command handler means pertaining to accessing a file within said emulated file system associated with said link to said host file initializing predetermined data structures associated with said emulated system file operation in a predetermined manner for executing a special link operation and issuing an input/output request;

a user table (USTBL) mechanism located in said host memory area, said USTBL mechanism having a number of locations for storing unique user description entries generated by said EMCU for emulated system users whose identities were previously validated during login; and, said server facilities including first server handler means including user security validation means, said security validation means in response to an input/output request generated by said file management component in response to an emulated system user request specifying access to the linked host file, performing a validation operation on an emulated system user by accessing said user table mechanism entry associated with said user requesting access to ascertain that access is being requested by a trusted user and would not compromise host system security and a second server means operatively coupled to said first server handler means, said second server means receiving said input/output request for executing a link file operation only when said validation operation confirms that the request was issued by a trusted user.

2. The host system of claim 1 wherein said second server includes access control means for performing an access control check for establishing that said emulated system user has the required access permissions to execute the link file operation.

3. The host system of claim 2 wherein the link file can be a file or a named pipe.

4. The host system of claim 1 wherein each unique user description entry includes emulated system descriptive information associated with the user by said executive service components which is not modifiable by the user.

5. The host system of claim 4 wherein said emulated system user descriptive information used to perform said validation operation includes a first portion containing user-id information and second and third portions containing addresses of predetermined data structures used by the executive service components to uniquely identify the user.

6. The host system of claim 5 wherein said first server handler means performs said validation operation by comparing the portions of said emulated system user descriptive information previously stored in said user table mechanism as an entry for the user with corresponding portions of emulated system user descriptive information obtained from said shared memory area obtained by said first server handler which is associated with a current user issuing said emulated system user request.

7. The host system of claim 6 wherein said first server handler means upon determining that there is no identical comparison indicating that the current user is untrustworthy, signals the occurrence of a user security violation and does not initiate a series of operations for enabling execution of the link file operation.

8. The host system of claim 6 wherein said first server handler means upon determining that there is an identical comparison identifying no change in user personality confirming that the current user is trustworthy, initiates a series of operations for enabling execution of the link file operation.

9. The host system of claim 3 wherein said second server means performs a validation of access permissions by said access control means at a time when file access is to take place which corresponds to an open command in the case of a file and on a first read or write request in the case of a named pipe.

10. The host system of claim 2 wherein said operating system facilities include Inode permission files defining access permissions for each file of said host system, said access control means generating a number of system calls to said operating system facilities for validating user access on the basis of both basic and extended permissions defined by said Inode permission files.

11. The host system of claim 1 wherein said LK command is an extension of an existing command in a set of commands utilized by said emulated system.

12. The host system of claim 11 wherein said LK command has a predetermined format having a number of different portions, a first portion being coded to specify a link command code for invoking said command handler means, a second portion being coded for designating an emulated system name of the link, a third portion being coded to include a prefix designating a host path name for the link and a fourth portion containing information for defining certain characteristics of the host file being linked.

* * * * *

UNITED STATES PATENT AND TRADEMARK OFFICE
CERTIFICATE OF CORRECTION

PATENT NO. : 5,572,711                                        Page 1 of 2
DATED      : November 5, 1996
INVENTOR(S): Thomas S. Hirsch, Richard S. Bianchi, Ron B. Perry It is certified that error appears in the above-identified patent and that said Letters Patent is hereby corrected as shown below:

Column 1, lines 27-29, delete "A Mechanism for Viewing the Files of a Host System by an Emulated System" and insert --A Copy File Mechanism for Transferring Files Between a Host System and an Emulated File System--.

Column 3, line 45, after "UNIX", insert --*--.

Column 3, line 45, delete "AIX$^{tm}$" and insert --AIX**--.

Column 3, line 51, delete "GCOS6$^{tm}$" and insert --GCOS6***--.

UNITED STATES PATENT AND TRADEMARK OFFICE
CERTIFICATE OF CORRECTION

PATENT NO. : 5,572,711
DATED : November 5, 1996
INVENTOR(S) : Thomas S. Hirsch, Richard S. Bianchi, Ron B. Perry It is certified that error appears in the above-identified patent and that said Letters Patent is hereby corrected as shown below:

At the bottom of Column 3, insert the following footers:

--* UNIX is a registered trademark in the United States and other countries, licensed exclusively through X/Open Company Limited.--.

--** AIX is a registered trademark of International Business Machines Corporation.--.

--*** GCOS is a registered trademark of Bull HN Information Systems Inc.--.

Column 11, line 35, after "type", insert --is--.

Column 13, line 5, delete "functionability" and insert --functionality--.

Signed and Sealed this

Thirty-first Day of March, 1998

Attest:

BRUCE LEHMAN

*Attesting Officer*     *Commissioner of Patents and Trademarks*